Aug. 30, 1932.  A. H. PFUND  1,875,134
HARDNESS TESTING APPARATUS AND METHOD
Filed Oct. 12, 1929  3 Sheets-Sheet 1
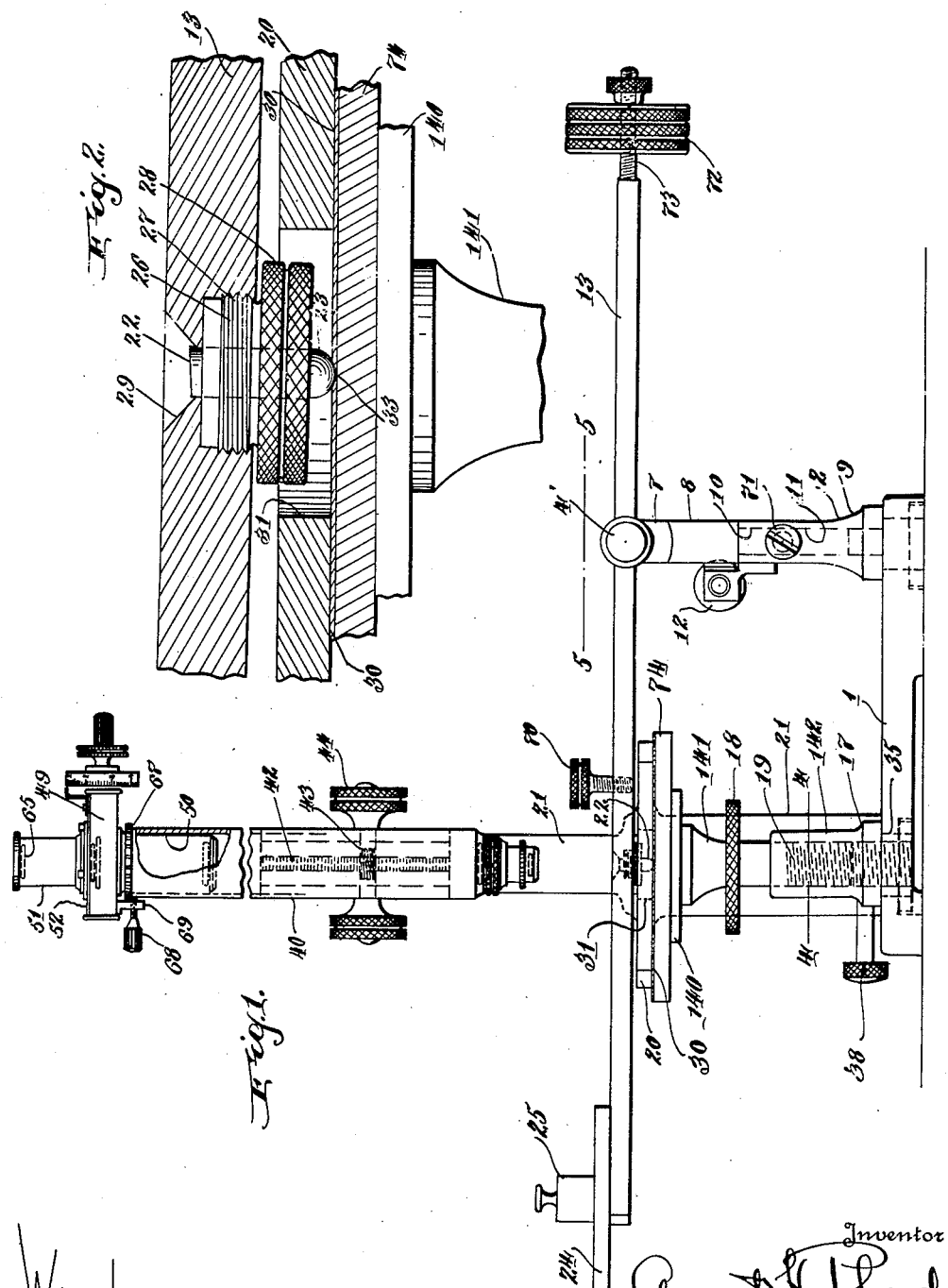

Aug. 30, 1932.  A. H. PFUND  1,875,134
HARDNESS TESTING APPARATUS AND METHOD
Filed Oct. 12, 1929  3 Sheets-Sheet 2
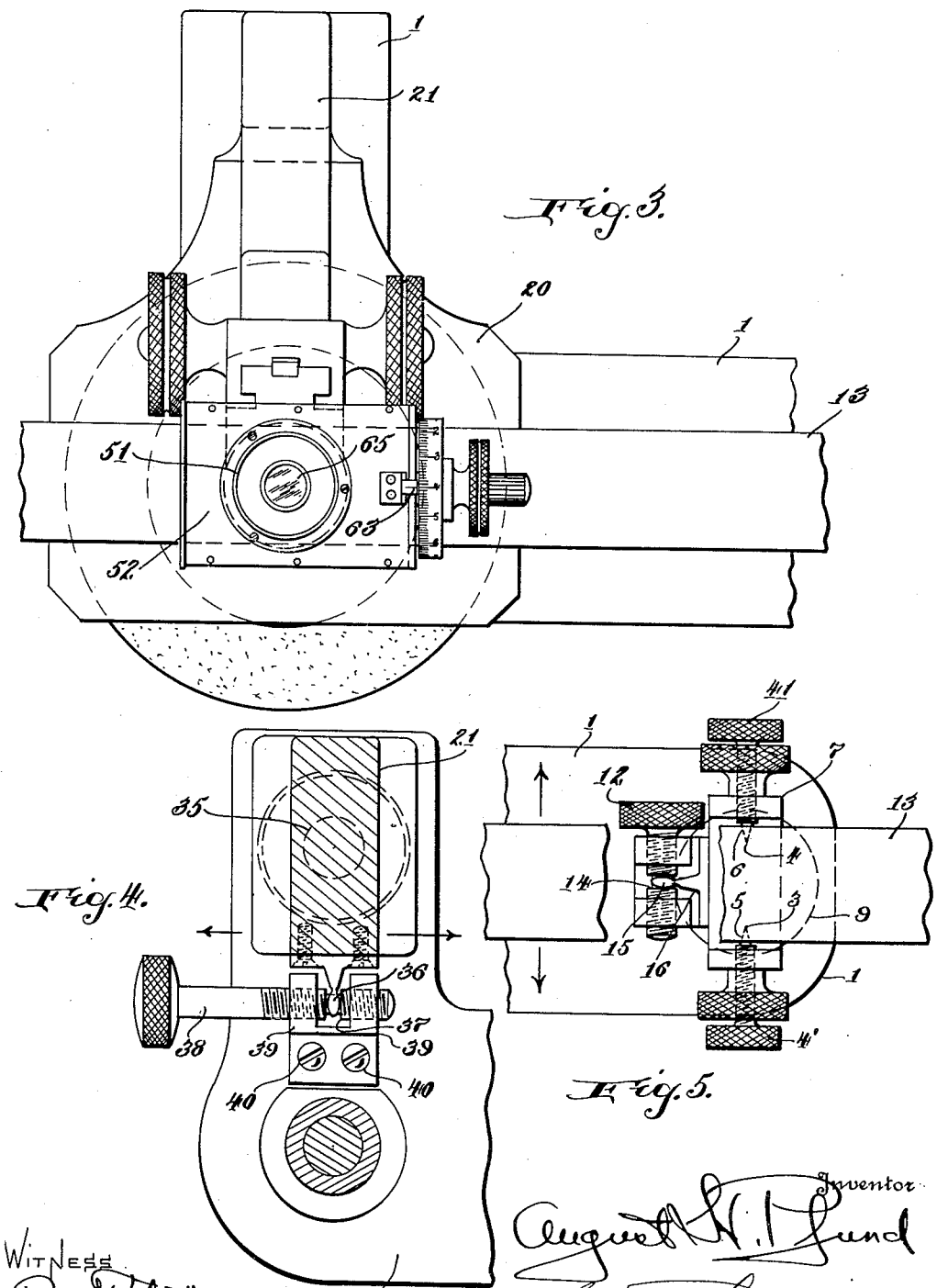

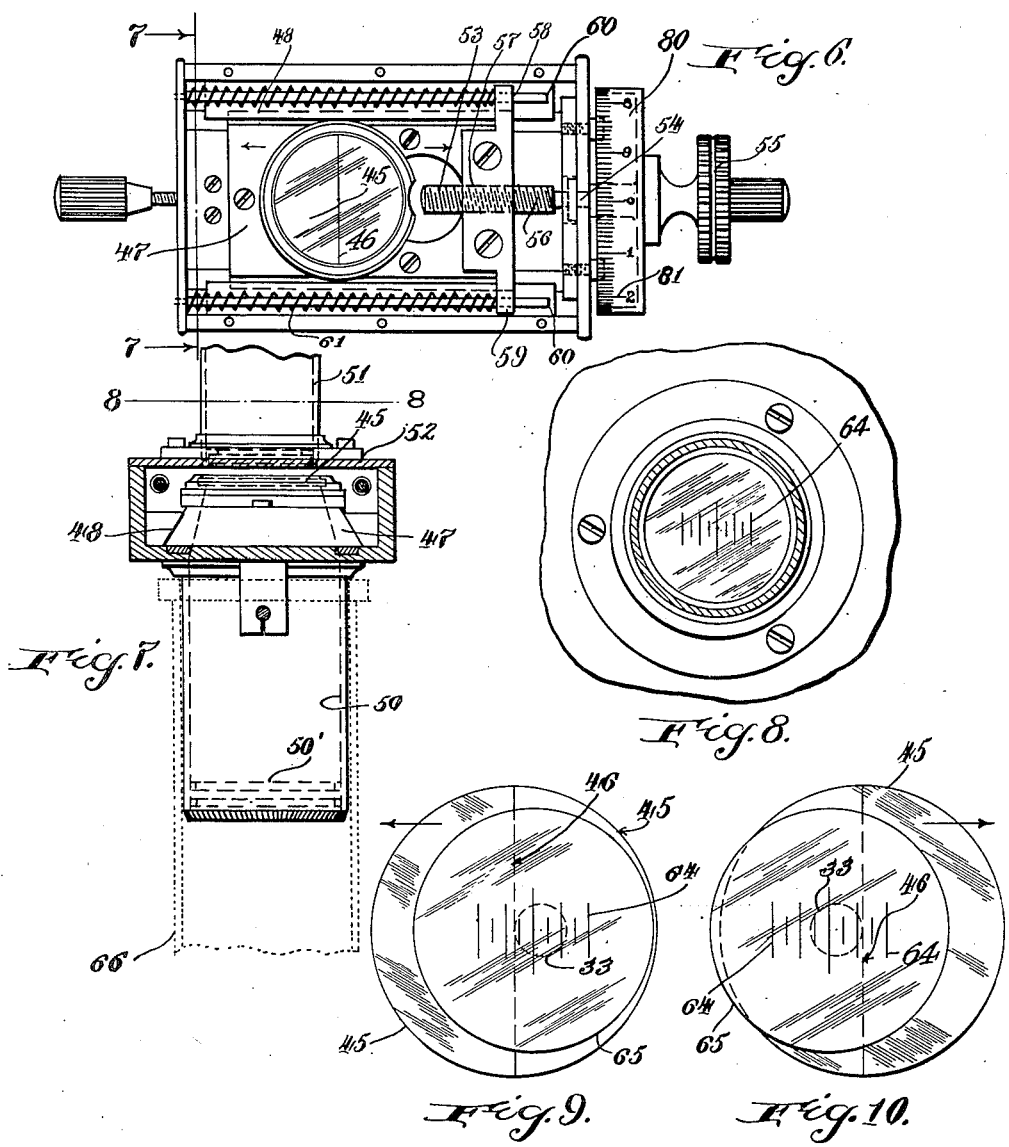

Patented Aug. 30, 1932

1,875,134

UNITED STATES PATENT OFFICE

AUGUST HERMAN PFUND, OF BALTIMORE, MARYLAND

HARDNESS TESTING APPARATUS AND METHOD

Application filed October 12, 1929. Serial No. 399,144.

In grading paint, varnishes and other coating materials, as well as other substances, it is necessary to compare the hardness of the surface presented by the coating or the surface of the material being tested, whether or not it be a coating, with any selected standard. The present machine is utilized in accordance with the preferred method of operation in comparing the forces or weights necessary to produce depressions of standard dimensions in a definite known period or in equal periods of application. In accordance with the present practice several depressions are formed in the sample by the application of different weights or forces to a single instrument and the weight or force required to produce the standard depression is determined from the data thus obtained. In accordance with the preferred practice, these depressions are made by means of a tool or bit of extreme hardness, the operative portion of which, i. e., the portion which forms the depression being hemispherical so that the depressions formed in the materials being tested are circular and of spherical contour. It will, of course, be understood, however, that the use of a tool or bit in this exact form instead of any other convenient contour is not essential to the practice of the invention, at least in its broader conception.

The spherical contour of the testing tool or bit is, however, of considerable advantage in that by measuring and comparing the diameters of the depressions, the depth is easily ascertainable by a well known mathematical formula or the depths may be compared without deducing them by ascertaining the diameters of the respective depressions.

In accordance with the preferred method, the testing instrument or bit first described or any suitable bit is mounted on and secured to a scale beam which is first carefully balanced, the instrument or bit being located between the pivotal point of the beam and the pan. The sample to be tested is then placed beneath the bit, a known weight is placed on the pan and a reading is taken as to the diameter of the circle produced by the pressure of the bit against the surface of the material to be tested. In the first instance, in accordance with the practice in testing weights, varnishes, etc, a weight of 50 grams is placed on the pan and a reading taken. If the diameter of the depression is smaller than three divisions of the scale, an additional weight, say 50 grams, is added without moving the tool or bit. The weight is thus increased in successive stages until a reading larger than three divisions of the scale is obtained. The weight required to produce a reading of exactly three scale divisons is then determined by interpolation.

The proceeding to this end consists in plotting the weights used as abscissa and the diameters of the respective depressions produced by the corresponding weights as the ordinates. At least three readings, corresponding to three different weights, are made in connection with each sample. According to this inventor's established practice, the diameter indicating the depth of the depression made by the smallest weight must be less than a predetermined minimum and the diameter of the depression produced by the greatest weight must be over this minimum. The points thus obtained are connected by a smooth curve, which is usually nearly a straight line, and abscissa corresponding to an ordinate of three scale divisions, i. e., the standard chosen for purposes of comparison, may be read from this curve. This ordinate corresponds to the weight which is to be recorded as indicating the hardness of the sample in question. In comparing the results obtained on different instruments, the actual distance on the microscope stage corresponding to one division on the micrometer eyepiece must be known. This distance is usually 0.1 millimeter.

In the accompanying drawings I have illustrated an instrument embodying the features of my invention in the preferred form.

In the drawings:

Figure 1 is a front elevation of the testing instrument assembled for the testing operation, a sample of the material to be tested being in position on the support and the testing tool being in contact with the sample.

Figure 2 is a section in a plane parallel to the plane of Figure 1 taken through the testing tool and the sample and sample support, the figure being drawn on an enlarged scale.

Figure 3 is a fragmentary top plan of the instrument showing the top of the microscope, the scale beam and the microscope stage or table, the work or testing sample also being shown in position.

Figure 4 is a horizontal section on the line 4—4 of Figure 1.

Figure 5 is a fragmentary plan looking downward at the beam pivot, the beam being broken away to show certain underlying parts.

Figure 6 is a top plan view of the cross hair lens operating mechanism, whereby the depressions or prints of the tool are measured.

Figure 7 is a vertical section through the same on the line 7—7 of Figure 6, looking in the direction of the arrows.

Figure 8 is a section on the line 8—8 in Figure 7.

Figures 9 and 10 are diagrammatic views of the eyepiece of the microscope showing the cross hair in the two measuring positions relating to a single depression, the cross hairs in the two views being located tangent to the opposite points or sides of the depression.

Referring to the drawings by numerals, each of which is used to indicate the same or similar parts in the different figures, the construction shown which may be characterized as closely resembling a laboratory scale of the beam type, comprises a base 1, on which is mounted at one end an upright 2 for supporting the axis of a beam 13 resembling a scale beam. This axis or bearing may consist of the usual aligned pivots 3 and 4, carried by adjusting screws 4', engaging suitable sockets 5 and 6 in the opposite sides of the beams. Said pivotal supports are mounted in a suitable U-shaped member 7 at the top of the upright 2. The upper portion 8 of the upright is pivotally and adjustably mounted on the lower end or base 9 of upright 2 by means of a stud 10 projecting downwardly from the bottom of the upper portion 8 and fitting in a suitable bearing 11 about the center of which the upper member 8 may be conveniently rotated, swinging the scale beam in a horizontal plane about the axis of the bearing 10, 11. The rotation of the top member 8 relatively to the bottom member 9 may be accomplished and controlled by means of a screw 12. The screw 12 is shown as having a central transverse groove 14 engaging with which is a jaw 15, carried by an arm 16 projecting from the pivoted upper portion 8 carrying the yoke 7 and beam 13. Obviously, by rotating the screw 12 seated in the stationary member 9 the arm 16 and hence the yoke 7, carrying the beam, are swung about an upright axis, swinging the beam in a horizontal plane or direction.

Referring now to the work support the table 140 is mounted on a post 141 which for purposes of adjustment may be threaded as to its lower portion engaging a correspondingly threaded hole 142 in an upright socket member 17 secured to the base 1, as is the upright 9. The post 141, with the table 140, is adjusted up and down by means of a knurled wheel or nut 18, the rotation of which causes the threads 19 to operate.

The microscope stage 20 serves to position the work or sample to be tested as to the upper surface of the same which is to be engaged by the tool or bit 22 to be described. This member 20 is secured to or formed integrally with the microscope supporting upright 21. This upright supporting member 21 as shown is mounted at its lower end on the base 1 of the testing apparatus being located in the rear of the post socket 17 carrying the work table.

The microscope stage 20 is in accordance with the preferred construction shown located at a fixed distance from and above the base 1 and is used most frequently as a gauge to determine the position of the upper surface of the work, the latter being supported on the table 140, which is adjusted upwardly until the upper surface of the work or sample bears on the bottom of the stage 20.

Cooperating with the stage 20 and the table 140 is the tool or bit 22 preferably in the form of a cylindrical member of quartz which is a transparent material. The tool has a rounded lower end preferably of hemispherical form or spherically convex as to its downwardly disposed surface 23. This tool or bit is secured to the beam between the pivotal point 3, 4 and the scale pan 24 carrying the weights 25 and in line with the microscope stand 21 and with table 140.

The manner of securing this tool or bit 22 to the beam is best illustrated in Figure 2.

In the form of the invention shown, the tool or bit 22 is secured in and to the screw plug 26, in alignment with its axis or coaxially with the plug. The plug in turn is seated in a correspondingly threaded socket 27, entering the scale beam from the bottom. The screw plug 26 is also provided with knurled grips 28 at its lower end by which the plug is engaged to insert and remove it. The tool or bit is shown as exposed as to its upper end, the scale beam 13 being countersunk at 29 in alignment with the axis of the socket 27 for this purpose.

In the preferred form of the invention shown the top end of the tool or bit 22 is inclined from the horizontal by an angle of four degrees and the lower surface 23 is accurately ground and polished to an exact hemispherical form.

Figure 2 also illustrates the microscope stage 20 for positioning the top surface of the sample 30, said stage 20 being formed with a central opening 31 through which the transparent tool or bit 22 extends into contact with this sample. The end of plug 26 comprising the knurled wheels 28 also occupies a portion of the space thus provided. The hemispherical end 23 of the bit is shown in contact with the sample 30 forming in the coating 32 a depression 33 of spherical curvature. The microscope stand 21 already referred to is shown in the form of an upright member supported on the base 1 at its lower end and connected thereto by a stud 35. This stand 21 supports the microscope stage 20 already referred to, fully illustrated in Figure 3, which projects forwardly beneath the beam 13 and near its lower end the stand 21 is provided with a forwardly projecting fork or arm 36, see Figure 4, which engages a groove 37 in an adjusting screw 38. This adjusting screw is threaded through a split nut 39 secured to the base 1 in any suitable manner as by means of screws 40. The arm 36 and groove 37 being shown or located in the split limiting the adjustment it will be apparent that by operating the screw 38 controlling the fork, the microscope stand, including the stage 20, is moved and adjusted on the line of an arc in the general direction of the length of the beam 13. This adjustment of the microscope stand and stage and lateral adjustment of the beam by means of the screw 12 provide the proper spacing and location of the testing depressions 33 and for regulating the position of the circles of contact or depressions in the microscope field so that these diameters may be measured conveniently by means of the micrometer scale in the eyepiece.

The microscope 40 and the hairline lens 45 with its cross hair 46 are moved upwardly and downwardly by means of the rack and pinion 42 and 43, the latter being operated by knurled wheels 44.

The plate 47 which carries the hairline lens 45 is mounted to slide in the direction of the length of the beam 13 in ways 48 supported in the measuring box 49 secured to the upper end of the lens tube 50. The eyepiece 51 is mounted on the cover 52 of the box in alignment with the member 50.

In Figure 6 the cover 52 is removed to show the underlying construction. In the form shown the box 49 carries a screw 53 extending through and connected to the end of the box by means of a swivel 54 and provided at one end with a knurled wheel 55 for operating the screw, and at the other end with a threaded portion 56 which engages a corresponding threaded opening 57 in a block 58 secured to the sliding plate 47. It will be noted that the block 58 is provided at each end with an ear 59, which is pierced to admit a guide pin 60, mounted in the box and encircled by a coiled compression spring 61 which tends to thrust the block 58 and the plate 47 to which it is secured to the right in Figure 6. The plate 47 with the hairline lens 45 and cross hair 46 is thus adjusted at the will of the operator by turning the screw 53, the distance moved by the plate and the cross hair 46 being measured and indicated by the scale 80 on the wheel 81 secured to the screw 53. A suitable index 63 cooperating with the scale is shown in Figure 3 secured to the box cover 52 which is removed in Figure 6. A scale 64 shown diagrammatically in Figure 9 is marked on the eyepiece 65.

The lens tube 50 carrying microscope lens 50' is supported in the microscope tube 66, in which it has a close sliding fit. The upper end of the tube 66 is preferably formed with a knurled wheel 67 by which it may be rotated and the measuring box 45 and the parts connected thereto are secured against displacement by means of a set screw 68 threaded into an ear 69, depending from the box, the set screw preferably engaging the tube beneath the knurled wheel 67 in connection with which it acts as a hook.

The scale beam 13 is supported with the tool or bit 22 in inoperative position by means of a supporting screw 70 threaded downwardly through the beam above and in line with the microscope stage 20 and bearing thereon when adjusted downwardly supporting the beam and holding the tool out of contact with the work or the platform 140.

The pin or stud 10 carrying yoke 7 is located in the upright or post 2 by means of a set screw 71 and the beam is balanced by the weights 72 moved by means of screw 73 mounted on and having a threaded engagement with the threaded tail 73 of the beam 13.

A disc or plate 74 with a varnish or paint film 30 on its surface to be tested is placed on the supporting platform 140 which is then screwed up until the film is nearly in contact with the lower surface of the microscope stage 20. By means of the set screw 71 the quartz tool 22 is lowered until it is just above the surface of the film but not in contact with it. Downward pressure is supplied by a weight 25 in the center of the scale pan 24. The microscope is then focussed on the film surface and the sample is moved by means of screw 38 and the beam by means of screw 12 until an area free from imperfections is located beneath the bit. The platform 14 is then raised until the sample is pressed tightly against the under surface of the microscope stage 20.

The quartz tool is then lowered by unscrewing screw 71 until the tool rests on the surface of the varnish film being seen through the transparent tool. When the microscope is focussed accurately, a regular circle of contact should appear in the field. If the circle of contact is irregular or broken, it means either that the surface of the film is not level enough or that there is dirt on the quartz tool. In the former case the sample may be moved and the beam adjusted by screw 12 until a smooth portion of surface is engaged and in the latter case, the quartz tool can be removed and cleaned.

A clean cut and regular circle of contact must be obtained and the position of this circle in the microscope field must be adjusted so that its diameter may be measured by means of the micrometer scale in the eyepiece. It is not necessary for the circle to be actually superimposed on the scale as the movable cross hair serves to establish the position of the edge of the circle with relation to the scale. The circle must, however, be sufficiently centered so that none of the circumference extends beyond the limit of the scale. In order to center the circle in the field, the quartz tool 22 being raised, the set screws 12 and 38 may be operated to adjust and locate the tool 22 and table 140 as required.

Having obtained a satisfactory location for the circle of contact in the field, it is necessary to move the sample independently of the table and stage in order to obtain a fresh clear surface for the actual measurement. The quartz tool 22 is raised while the sample plate 74 with sample 30 is moved slightly in any direction, after which it is again lowered and allowed to rest on the surface of the sample being tested for one minute before making the reading.

The actual reading is made by using the movable cross hair 46, the said cross hair being brought by turning screw 53 to a tangent with the circle or depression 33 first on one side and then on the other, the distance between the two tangent points being indicated by the scale 80 on the screw 53 by which the cross hair 46 is moved. The preferred method of expressing the hardness is in terms of the weight required to produce a circle whose diameter is equal to a predetermined number of divisions, as three divisions, on the micrometer scale. The method of arriving at this result is to place a small weight, say, 50 grams on the pan, make a reading and observe the diameter. If the diameter of the circle is smaller than the selected number of divisions as three, according to the inventor's present practice, another weight, say 50 grams, is added without moving the tool. The weight is thus increased in successive stages until a reading larger than three divisions is obtained. The weight required to produce a reading of exactly three divisions is then determined by graphic interpolation.

Interpolation is made by plotting the weight as the abscissa and the diameter produced by this weight is the ordinate. At least three readings for three different weights should be made and plotted. The diameter produced by the lowest weight must be less than three divisions in the eyepiece and the diameter produced by the greatest weight must be over three divisions, assuming as aforesaid that three divisions of the scale be selected as the standard. For accuracy, the difference between the depressions of lowest diameter and the greatest diameter should not be over one division. The points plotted are then connected by a smooth curve which is usually nearly a straight line, the point on the abscissa corresponding to an ordinate of three divisions being read from this curve, indicates the weight which is to be regarded as representing the relative hardness of the sample in question, i. e. its number on this inventor's comparative scale of hardness.

In comparing the results obtained on different instruments, the actual distance on the microscope stage corresponding to one division in the micrometer eyepiece must be known. This distance is usually about 0.1 millimeter, but it may be accurately determined for each instrument by placing a millimeter scale on the microscope stage and determining the number of scale divisions corresponding to 1 millimeter.

The fact that the diameter of the impressions is measured before the bit or tool 22 is withdrawn is of particular importance as in this way the effect of the elasticity of the material being tested is avoided, otherwise a considerable error is apt to result due to the more or less irregular recovery of the material and partial filling up of the depression after the tool is withdrawn, which makes it impossible to compare with accuracy the hardness of materials of different degrees of elasticity. Where the tool must be withdrawn before the depression is measured, other errors occur due to the changing of the cavity or depression incident to withdrawing the tool prior to measurement.

I have thus described specifically and in detail a hardness testing instrument, the manner of constructing, operating and using the same, and a method of testing or comparing hardness of different coatings in order that the invention and the manner of applying and using it may be fully understood, however, the specific terms herein are used descriptively rather than in a limiting sense, the scope of the invention being defined in the claims.

What I claim as new and desire to secure by Letters Patent is:

1. An apparatus for testing the hardness of coating and other materials comprising a transparent bit, means for forcing said bit into the material to be tested and means for measuring the width of the indentations and observing them through the bit while it is still occupying its advanced position in the indentation.

2. A hardness testing apparatus for coating materials and the like which consists of a scale beam suitably pivoted and having means for supporting a weight at one end, a transparent bit for indenting the surface to be tested secured to said beam between said pivotal point and said weight supporting means and means for supporting the material to be tested beneath said bit.

3. A hardness testing apparatus for coating materials and the like which consists of a scale beam suitably pivoted and having means for supporting a weight at one end, a surface indenting bit in operative relation to said beam between said pivotal point and said weight supporting means and means for supporting the material to be tested beneath said bit, said bit being of transparent material and having an indenting surface and the apparatus including means for measuring the width of the indentations produced thereby while the bit is in the indentation.

4. A hardness testing apparatus for coating materials and the like which consists of means for applying a known force, a surface indenting bit in operative relation to said means to be actuated thereby and means for supporting the material to be tested beneath said bit, said bit having a convex indenting surface and the apparatus including means for measuring the width of the indentations produced thereby, and means for adjusting the apparatus to change the relative positions of said indenting bit and support.

5. A hardness testing apparatus for coating materials and the like which consists of a scale beam suitably pivoted and having a weight at one end, a surface indenting bit operatively related to said beam between said pivotal point and said weight and means for supporting the material to be tested beneath said bit, said bit having an indenting surface and the apparatus including means providing for swinging said scale beam laterally.

6. A hardness testing apparatus for coating materials and the like which consists of means of applying a known force, a surface indenting bit secured to said means in operative relation thereto, and means for supporting the material to be tested beneath said bit, said bit having an indenting surface and the apparatus including means for adjusting the position of said work support transversely to the direction of application of said force.

7. A hardness testing apparatus for coating materials and the like which consists of a scale beam suitably pivoted at an intermediate point and having a surface indenting bit secured to said beam between said pivotal point and said weight supporting means and means for supporting the material to be tested beneath said bit, said bit having an indenting surface of known convexity and the apparatus including means for measuring the width of the indentations produced thereby, means for swinging said scale beam laterally and means for moving said work support in the direction of the length of the beam.

8. An apparatus for testing the hardness of coating and other materials comprising a transparent bit having a convex surface of spherical curvature and means for forcing said bit into the material to be tested with a known pressure, and means for measuring the width of the indentations while the bit is still occupying its advanced position in the indentation.

9. An apparatus for testing the hardness of coating and other materials comprising a transparent bit having a convex surface and means for forcing said bit into the material to be tested with a known pressure, and means for measuring the width of the indentations thus formed while the bit is still occupying its advanced position in the indentation.

10. An apparatus for testing the hardness of coating and other materials comprising a transparent bit having a convex surface and means for forcing said bit into the material to be tested with a known pressure, and microscopic means for measuring the width of the indentations thus formed while the bit is still occupying its advanced position in the indentation.

11. An apparatus for testing the hardness of coating and other materials comprising a bit having a convex surface and means for forcing said transparent bit into the material to be tested with a known pressure, and microscopic means for measuring the width of the indentations thus formed, a cross hair and a scale for measuring the indentation while the bit is still occupying its advanced position in the indentation.

12. An apparatus for testing the hardness of coating and other materials comprising a bit having a convex surface and means for forcing said transparent bit into the material to be tested with a known pressure, and microscopic means for measuring the width of the indentations thus formed while the bit is in the indentation, and an index, means for adjusting the same over the indentation, means for determining the extent of the adjustment and a fixed scale along which the index moves.

13. In a hardness testing machine a transparent bit, means for forcing it into the material to be tested with a predetermined pressure, means for observing and measuring the depression from above, viewing the depression through the bit, the bit having its upper surface at an angle varying from a right angle to the axis of vision whereby reflection of the light in the direction of observation is avoided.

Signed by me at Baltimore, Maryland, this 9th day of October, 1929.

AUGUST HERMAN PFUND.